United States Patent
Ketelaars et al.

(10) Patent No.: US 11,493,330 B2
(45) Date of Patent: Nov. 8, 2022

(54) METHOD FOR MEASURING A HEIGHT MAP OF A TEST SURFACE

(71) Applicant: MITUTOYO CORPORATION, Kanagawa (JP)

(72) Inventors: Hendrik Ketelaars, Gemert (NL); Adriaan Tiemen Zuiderweg, Breda (NL); Lukasz Redlarski, Eindhoven (NL); John Quaedackers, Veldhoven (NL)

(73) Assignee: MITUTOYO CORPORATION, Kanagawa (JP)

( * ) Notice: Subject to any disclaimer, the term of this patent is extended or adjusted under 35 U.S.C. 154(b) by 6 days.

(21) Appl. No.: 17/119,246

(22) Filed: Dec. 11, 2020

(65) Prior Publication Data
US 2021/0180943 A1 Jun. 17, 2021

(30) Foreign Application Priority Data

Dec. 13, 2019 (EP) .................................. 19216041

(51) Int. Cl.
*G01B 11/25* (2006.01)
*G01B 11/22* (2006.01)
(Continued)

(52) U.S. Cl.
CPC .......... *G01B 11/25* (2013.01); *G01B 11/0608* (2013.01); *G01B 11/22* (2013.01); *G01N 21/55* (2013.01); *G01N 21/956* (2013.01)

(58) Field of Classification Search
CPC ..... G01B 11/0608; G01B 11/22; G01B 11/24; G01B 11/2408; G01B 11/2416;
(Continued)

(56) References Cited

U.S. PATENT DOCUMENTS

| 8,482,743 B2* | 7/2013 | Segev ................ G01B 11/2433 356/625 |
| 8,547,557 B2* | 10/2013 | Jansen ..................... G01B 9/04 356/73 |

(Continued)

FOREIGN PATENT DOCUMENTS

| EP | 2977720 A1 | 1/2016 |
| EP | 2977720 B1 | 6/2019 |

(Continued)

OTHER PUBLICATIONS

U.S. Appl. No. 17/106,638 to Masafumi Yamanaka, filed Nov. 30, 2020.

(Continued)

*Primary Examiner* — Gordon J Stock, Jr.
(74) *Attorney, Agent, or Firm* — Greenblum & Bernstein, P.L.C.

(57) ABSTRACT

A method for measuring a height map of a test surface having a varying reflectivity using a multi-sensor apparatus including a pre-scan sensor and a height measuring sensor is disclosed. The multi-sensor apparatus further comprises one or more light sources configured to illuminate the test surface and a spatial light modulator. The spatial light modulator is placed in a light path between the one or more light sources and a measuring location of the multi-sensor apparatus and is configured to modulate light emitted from at least one of the light sources. The method comprises performing a measurement for determining an illumination intensity map of the test surface and a measurement for performing a height map of the test surface.

16 Claims, 5 Drawing Sheets

(51) Int. Cl.
*G01N 21/55* (2014.01)
*G01N 21/956* (2006.01)
*G01B 11/06* (2006.01)

(58) Field of Classification Search
CPC ............ G01B 11/2425; G01B 11/2433; G01B 11/2441; G01B 11/245; G01B 11/25; G01B 11/2504; G01B 11/2509; G01B 11/2513; G01B 11/2518; G01B 11/2522; G01B 11/2527; G01B 11/2531; G01B 11/2536; G01B 11/254; G01B 11/2545; G01N 21/47; G01N 21/55; G01N 21/956
See application file for complete search history.

(56) References Cited

U.S. PATENT DOCUMENTS

| | | | |
|---|---|---|---|
| 8,917,940 B2 * | 12/2014 | Bryll | G06T 7/13 382/199 |
| 9,103,651 B2 | 8/2015 | Haitjema et al. | |
| 9,417,123 B2 | 8/2016 | Yoshida et al. | |
| 9,562,857 B2 * | 2/2017 | Debevec | G01B 11/30 |
| 9,568,304 B2 | 2/2017 | Haitjema et al. | |
| 9,733,464 B2 | 8/2017 | Moriuchi et al. | |
| 9,746,315 B1 * | 8/2017 | Schmit | G02B 21/0056 |
| 9,881,400 B2 | 1/2018 | Zuiderweg et al. | |
| 9,885,563 B2 * | 2/2018 | Ume | G01B 11/2513 |
| 10,089,415 B2 * | 10/2018 | Grau | G01B 11/2545 |
| 10,126,252 B2 * | 11/2018 | Haugen | G01N 21/956 |
| 10,302,415 B2 | 5/2019 | Quaedackers | |
| 10,317,198 B2 * | 6/2019 | Immer | H01L 22/12 |
| 10,368,053 B2 * | 7/2019 | Martinez Bauza | G01B 11/2513 |
| 10,488,184 B2 * | 11/2019 | Heidrich | G01B 11/2441 |
| 10,563,974 B2 | 2/2020 | Quaedackers et al. | |
| 10,636,157 B2 | 4/2020 | Quaedackers | |
| 2010/0149551 A1 * | 6/2010 | Malinkevich | G01B 11/25 356/603 |
| 2011/0058031 A1 | 3/2011 | Kurihara et al. | |
| 2014/0320633 A1 | 10/2014 | Haugen | |
| 2014/0362383 A1 | 12/2014 | Haitjema et al. | |
| 2015/0233707 A1 * | 8/2015 | Huntley | G01B 11/2513 348/136 |
| 2016/0027194 A1 | 1/2016 | Zuiderweg et al. | |
| 2018/0031415 A1 | 2/2018 | Haitjema et al. | |
| 2019/0219380 A1 | 7/2019 | Quaedackers | |

FOREIGN PATENT DOCUMENTS

| | | |
|---|---|---|
| KR | 10-2006-0057036 A | 5/2006 |
| WO | WO-2021079541 A1 * | 4/2021 |

OTHER PUBLICATIONS

European Extended Search Report issued in EP Counterpart Patent Appl. No. 19216041.4, dated Jun. 17, 2020.

* cited by examiner

METHOD FOR MEASURING A HEIGHT MAP OF A TEST SURFACE

CROSS-REFERENCE TO RELATED APPLICATIONS

The present application claims priority under 35 U.S.C. § 119 of European Application No. 19216041.4, filed on Dec. 13, 2019, the disclosure of which is expressly incorporated by reference herein in its entirety.

BACKGROUND OF THE INVENTION

1. Field of the Invention

The invention relates to a method for measuring a height map of a test surface with large variations of reflectivity using a multi-sensor apparatus including a spatial light modulator.

2. Description of Related Art

European Patent EP 2977720 B1 discloses a method for measuring a high accuracy height map of a test surface wherein use is made of a multi sensor optical profiler including a pre-map sensor and a high resolution sensor. The method comprises measuring a coarse height map using the pre-map sensor, subdividing the course height map into sections as appropriate for the field of view of the high resolution sensor and measuring the high accuracy height map with the high resolution sensor by scanning the test surface through the focal range of the high resolution sensor.

In optical profilometry techniques such as confocal, white light interferometry, focus variation, and structured illumination microscopy, use is made of a light source to illuminate a test surface. Normally the illumination intensity of the light source is set with respect to the signal intensity of the measurement apparatus to achieve the best performance of the measurement apparatus.

In practice, the test surface may show large reflectivity differences within one field of view of the measurement apparatus. These differences may be the result of the test surface including differing materials having different optical properties in the field of view, the test surface having different angles and/or high angles and/or large angular variations on the test surface, shadows on the test surface which are for example produced by features such as steps of the test surface, and glint from sharp edges or defects on the test surface. These reflectivity differences negatively affect the measurement quality a measurement of the test surface.

In case of large local reflectivity variations on the test surface the illumination intensity, according to methods known in the art, may be set such that the signal intensity received by the measurement apparatus from high reflectivity regions of the test surface is optimised for the measurement apparatus. In this case the signal for the darker regions, e.g. the regions with a lower reflectivity, will be poorer because the measurement apparatus does not receive sufficient light for a high quality measurement. The lighting setting, which is optimised for high reflectivity regions, negatively effects the measurement quality for the darker regions.

Similarly, the illumination intensity may also be set such that the measurement sensor receives an optimised light intensity from the low reflectivity regions of the test surface such that a measurement of these regions results in high quality images. In this case the image quality of the brighter regions, e.g. the regions with a higher reflectivity, will be poorer because of e.g. oversaturation of the sensor of the measurement apparatus.

This problem might be reduced by combining multiple measurements with different illumination intensities using the measurement apparatus. In this case separate measurements are taking using different light intensity settings for the light source. The images obtained in these separate measurements are then be combined to create a higher quality image of the test surface wherein effects of the reflectivity differences of the test surface have been reduced. The images may for example by combined by replacing regions of an image that reflected too much light for a proper measurement with regions of an image that was obtained using a lower light intensity.

This approach for improving image quality lowers the throughput of the measurement apparatus because multiple high quality images have to be taken of the test surface. In addition, effects such as height drift effects between two successive measurements might introduce errors in the combined measurement, negatively effecting the performance of the measurement apparatus when multiple measurements are required.

There is a need to improve optical microscopic profilometry measurement methods of test surfaces having variations of reflectivity.

SUMMARY OF THE INVENTION

Accordingly there is provided a method for measuring a height map of a test surface having a varying reflectivity using a multi-sensor apparatus including a pre-scan sensor and a height measuring sensor, wherein the multi-sensor apparatus further comprises one or more light sources configured to illuminate the test surface and a spatial light modulator, wherein the spatial light modulator is placed in a light path between the one or more light sources and a measuring location of the multi-sensor apparatus, and wherein the spatial light modulator is configured to modulate light emitted from at least one of the light sources, wherein the method comprises:

placing the test surface in the measuring location of the multi-sensor apparatus;

illuminating the test surface using one or more of the light sources;

measuring, using the pre-scan sensor, the amount of light reflected from the test surface in a field of view of the pre-scan sensor;

determining, based on the measurement by the pre-scan sensor of the amount of light reflected, the reflectivity of the test surface in the field of view of the pre-scan sensor;

determining an illumination intensity map based on the determination of the reflectivity in the field of view of the pre-scan sensor;

illuminating the test surface using one or more of the light sources, e.g. another one of the one or more light sources;

using the spatial light modulator to modulate light emitted by one or more of the light sources creating a modulation pattern of light on the test surface based on the illumination intensity map; and measuring the height map of the test surface by means of the height measuring sensor.

An optimal or improved signal of a measurement sensor may in practice achieved by setting the light intensity such that the maximum signal intensity is just below the saturation level of the measurement sensor. Thus, for a measurement sensor measuring light reflected from a test surface an optimal light intensity is such that the maximum signal intensity received by the sensor from light reflected from the test surface is just below the saturation level of the sensor.

The method allows for measurements of test surfaces of varying reflectivity by using the spatial light modulator to increase relative light intensity in areas where reflectivity of the test surface is lower and to decrease relative light intensity in areas where reflectivity of the test surface is higher. This allows for a relative increase in measured light intensity by the height measurement sensor in areas where reflectivity of the test surface is lower. Similarly this also allows for a relative decrease in measured light intensity by the height measurement sensor in areas where reflectivity of the test surface is higher.

The multi-sensor apparatus for use in the method includes a pre-scan sensor for determining the reflectivity of the surface and a height measurement sensor for measuring height of the test surface. The pre-scan sensor does not necessarily need to be a sensor capable of measuring a height of the test surface. For example, the pre-scan sensor may determine a focused 2D image of the test surface using a camera. In another feature the pre-scan sensor may determine reflectivity or other illumination-relevant property of the test surface based on a non-imaging technique. For example, the pre-scan sensor may make use of reflectometry or scatterometry. Such methods may not be suitable for measuring height of the test surface but may be suitable for determining a surface condition of the test surface, such as reflectivity, relevant for the current method.

The height measuring sensor is used for measuring the height map of the test surface. The height measuring sensor may be a white light interferometry sensor, a focus variation sensor, or a (non-scanning) structured illumination microscope. The height measuring sensor may use lateral scanning or points from focus techniques to determine the height map. Preferably the pre-scan sensor performs the measurement of the reflectivity of the test surface faster than that the height measurement sensor measures the height map of the test surface. For example the measurement of the height map using the height measurement sensor takes twice as long as the measurement of the reflectivity using the pre-scan sensor.

The field of view of the height measurement sensor may be different from the field of view of the pre-scan sensor. For example the field of view of the height measurement sensor is 0.1×0.1 mm$^2$, whereas the field of view of the pre-scan sensor may be much larger, for example 1×1 mm$^2$. In such a case fewer pre-scans are needed to determine reflectivity of the test surface, speeding up the measurement process, in this example a hundred measurements with the height measurement sensor are needed to fully cover the field of view of the pre-scan sensor. In another example, the field of view of the pre-scan sensor may comprise the test surface completely and the field of view of the height measurement sensor is smaller. In another example, the field of view of the pre-scan sensor and the field of view of the height measurement sensor both completely comprise the test surface.

The multi-sensor apparatus further includes one or more light sources for illuminating the test surface. In measuring microscopes there are many possible light sources and many possible orientation of light sources relative to the measurement setup for illuminating the test surface. For example, the wavelength of the light emitted by the light sources may improve measurement quality depending on the test surface and sensor type used.

In a feature of the measurement apparatus used in the method according to the disclosure, illumination by the light source may be coaxial with a measurement axis of the height measurement sensor or the pre-scan sensor. For example, this is appropriate when a measurement is performed using height measurement sensor that is a white light interferometry sensor. Other options of relative orientation are measurement setups where illumination is provided at oblique angles relative to a measurement axis or where illumination is provided from below the test surface, for example from below a transparent test surface such as a lens. In another example, wherein the height measurement sensor makes use of shape from focus methods, the measurement is less dependent on which illumination method is used. Similarly, the light source during measurement of the reflectivity of the test surface does not have to be coaxial with the pre-scan sensor if the pre-scan sensor is a simple imaging sensor.

An optimal combination of illumination and sensing method may depend on the test surface of the sample that is measured. For example, if the test surface includes steps, illumination from multiple directions may improve performance of the measurement apparatus, because the steps are illuminated from multiple direction and the effect of shadows is minimised.

Other factors related to illumination in the measurement apparatus, such as wavelength, wavelength distribution, pulse frequency, and/or pulse length of the light may also be configured to provide an optimal illumination for the pre-scan sensor and/or the height measurement sensor given the sample to be measured.

The spatial light modulator may be a digital micro-mirror device type, ferroelectric liquid crystal on silicon type, or any other suitable type of spatial light modulator. The spatial light modulator is placed in a light path between the one or more light sources and a measuring location of the multi-sensor apparatus. Light emitted by at least one of the one or more light sources, used for illuminating the test surface during measurement of the height map, may be modulated by the spatial light modulator before the light is reflected by the test surface placed in the measuring location of the multi-sensor apparatus. This creates a modulation pattern on the test surface. The modulation pattern allows for brighter regions to receive a lower light intensity and darker regions to receive a higher light intensity. It is possible that the modulation pattern includes various degrees of light intensity, for example several regions with different higher light intensity and several regions with different lower light intensity.

The spatial light modulator is used to modulate light based on the illumination intensity map. The modulation pattern is used for improving the measurement of the height map by the height measurement sensor to provide the height measurement sensor with an optimal light intensity. The spatial light modulator may modulate the light such that light intensity for each pixel of the height measurement sensor may be optimal. An optimal light intensity may be a light intensity that allows the height measurement sensor to function optimally and to produce the highest measurement quality.

Before performing the height measurement a pre-scan is performed in which the pre-scan includes the steps of placing the test surface in the measurement location, illuminating the test surface using the one or more light sources, and measuring, using the pre-scan sensor, the amount of light reflected from a portion of the test surface in a field of view of the pre-scan sensor. Thus the pre-scan measurement is used to acquire information on reflectivity of the test surface by measuring the intensity of light reflected by different areas of the test surface.

The pre-scan measurement may further comprise measuring locations of sharp edges and defect localization. To counteract the glint from sharp edges or defects in the height measurement knowledge on the location of these features is advantageous. For example, during height measurement the effect of glint may be excluded by setting the associated local illumination intensity to zero using the spatial light modulator.

The light intensity information is subsequently converted into an illumination intensity map by determining, based on the measurement by the pre-scan sensor of the amount of light reflected, the reflectivity of the surface in the field of view of the pre-scan sensor, and determining an illumination intensity map, preferably an optimal illumination intensity map, based on the determination of the reflectivity in the field of view of the pre-scan sensor. The illumination intensity map includes information on the preferred modulation pattern for the test surface to allow for an improved height measurement of the test surface.

The illumination intensity map may be viewed as a map of the test surface including information on reflectivity of the test surface obtained from the pre-scan measurement and information on illumination settings for the light source and on settings for the spatial light modulator. The illumination intensity map may have a resolution equal to the resolution of the height measurement sensor and/or the resolution of the pre-scan sensor. The illumination intensity map may further comprise additional information such as locations of glints or defects, information on colour of the test surface, and/or information on material type of the test surface.

To perform the height measurement the test surface is illuminated using one or more of the light sources, subsequently the spatial light modulator is used to modulate light emitted by the second of the one or more light sources based on the illumination intensity map creating a modulation pattern on the test surface. The height map is measured by means of the height measuring sensor, preferably during improved measurement conditions for the height measurement sensor.

The measurement quality may be optimal when the modulation pattern on the test surface is such that the maximum signal intensity received by the height measurement sensor is just below the saturation level of the measurement sensor. Preferably, the light reflected from the test surface, during measurement of the height map, has a substantial uniform intensity such that the maximum signal intensity is just below the saturation level of the measurement sensor.

By using the method according to the disclosure, and in particular by the use of the spatial light modulator to modulate light and create a modulation pattern on the test surface according to the method of the disclosure, height measurements of test surfaces are improved. A high throughput may be maintained because there is no need to combine multiple height measurements with different illumination intensities. Further, problems with setting light intensity relative to brighter and/or darker regions of the test surface are alleviated by using the method to modulate the light intensity to improved values for the height measurement across the field of view of the height measurement sensor and/or across the test surface.

According to a feature of the disclosure, wherein the pre-scan sensor has a larger field of view than the height measurement sensor, the method further includes:
  subdividing the illumination intensity map into sub-fields each corresponding to a field of view of the height measurement sensor;
  illuminating a sub-field of the test surface using one or more of the light sources;
  using the spatial light modulator to modulate light emitted by the one or more of the light sources creating a modulation pattern of light on the illuminated sub-field of the test surface based on the illumination intensity map;
  measuring a height map of the illuminated sub-field by means of the height measuring sensor;
  repeating the above three steps for each sub-field of the test surface thus obtaining a height map for each sub-field of the test surface; and
  stitching the height maps of the sub-fields to form the height map of the test surface.

Throughput of the multi-sensor apparatus may be improved when a single pre-scan is combined with multiple height measurements. The pre-scan may measure a large portion of the test surface, whereas the height measurement has to be performed multiple times to measure the height map of the test surface. In practice this situation may arise when the pre-scan sensor has a larger field of view than the height measurement sensor.

In order to allow the method to make use of the larger field of view of the pre-scan sensor the illumination intensity map may be cut into sub-fields wherein each sub-field corresponds to a field of view of the height measurement sensor. For example, the pre-scan sensor has measured a portion of $1 \times 1$ cm$^2$ of the test surface and the height measurement sensor has a field of view of $1 \times 1$ mm$^2$ than the illumination intensity map may correspond to the portion of $1 \times 1$ cm$^2$ of the test surface and it may be cut into 100 sub-fields of $1 \times 1$ mm$^2$. This allows for a single pre-scan to be followed by 100 height measurements which measure a height map of the field of view of the pre-scan sensor. Throughput is increased because in this case the method only requires a single pre-scan instead of 100 pre-scans.

After subdividing the illumination intensity map into sub-fields each sub-field of the test surface is illuminated by one of the one or more light sources. The light emitted onto each of the sub-fields is then modulated by the spatial modulator based on the illumination intensity map and a modulation pattern on the test surface is created. This allows the light intensity in each sub-field, during height measurement in that sub-field, to be optimized for the height measurement sensor.

After height measurement in each of the sub-fields the corresponding height maps of the sub-fields are stitched together to form a height map of the test surface. The stitching may be performed by a known method.

According to a feature the illumination intensity map is further based on performance data of the pre-scan sensor with respect to a received light intensity and/or wherein the modulation pattern on the test surface is additionally based on performance data of the height measurement sensor with respect to a received light intensity.

This feature allows to compensate for innate differences in measurement technique between the pre-scan sensor and the height measurement sensor. Such differences may be the result of differences in an improved light intensity for each measurement technique and/or differences in light source used. The performance data may be obtained through simulations of the measurement, through trial and error, and/or through repeated use of the multi-sensor apparatus.

An optimal light intensity and the illumination intensity map may be determined based on additional factors besides the determined reflectivity of the test surface. In this feature the illumination intensity map is based additionally on performance data between the pre-scan sensor with respect to a received light intensity. This allows to create the illumination intensity map on, for example, a known bias of the pre-scan sensor.

The modulation pattern on the test surface may additionally be based on performance data of the height measurement sensor with respect to a received light intensity.

According to a feature, a size of the modulation pattern of the modulated light corresponds to a resolution of the height measurement sensor. This feature allows for light intensity to be optimized for each pixel of the height measurement sensor. Thus a size of the modulation pattern of the light modulated by the spatial light modulator may correspond to a pixel size of the height measurement sensor. This allows for improved image quality because this allows for each pixel of the height measurement sensor to receive a signal just below a saturation level of that pixel.

According to a feature, the method further includes dynamically modulating the illumination as the height measurement sensor is measuring. For example, for the measurement of microlenses and similar transparent and semitransparent objects might be best performed by specifying the local illumination via the spatial light modulator not only laterally for one static setting, but by dynamically varying the illumination as the measurement progresses. By using this method the top of the microlens might be illuminated with one lighting setting, while the undersurface of the lens is illuminated by another lighting setting. This feature may also benefit measurements of thin films, especially if there are variations in the thickness of the film or near edges of the film. This may further benefit measurements of materials where the transparency varies laterally. In another example of this feature the illumination is dynamically modulated as the height measurement sensor is measuring by using strobing illumination. During strobing illumination the test surface is illuminated using regular flashes of light emitted by one or more of the light sources.

According to a feature, the method further includes configuring at least one of wavelength, wavelength distribution, pulse frequency or pulse length of the light emitted by the light sources during illumination of the test surface. Configuring of wavelength, in other words colour of the light, may increase efficiency of the measurement. For example the reflectivity of the light may depend the colour of the test surface and an improved reflectivity may be achieved when the light has a similar colour as the test surface. This further allows for use of monocolor light, which has a small wavelength band, and white light, which has a broad wavelength band.

Configuring of pulse frequency and/or pulse length of the light may help for example when use is made of strobing illumination during the measurement process.

According to a feature, the method further includes using additional information, such as at least one of location of sharp edges, colour of the test surface, or material type of the test surface, to determine the illumination intensity map.

Knowledge of the location of sharp edges may improve height measurement. Further colour of the test surface as well as material type may influence performance of the height measurement sensor, for example by improved reflectivity or better contrast. To improve the quality of the measurement of the height map it is helpful to use this additional information.

According to a feature, the pre-scan sensor is configured to measure the additional information, such as at least one of location of sharp edges, colour of the test surface, or material type of the test surface, for determining the illumination intensity map. Using the pre-scan to detect this information may improve throughput of the measurement apparatus as no other sensor is required to acquire this information.

According to a feature, the pre-scan sensor is configured to measure a light intensity range that includes darkest and brightest portions of the test surface. Depending on test surface features some of sections of the test surface may appear very dark or very bright relative to the rest of the test surface. Knowledge of these sections may be obtained through measurement with the pre-scan sensor. In order to avoid having to perform multiple pre-scans due to the pre-scan sensor not being able to accurately measure very bright or very dark sections, and thus improve throughput of the measurement apparatus, the pre-scan sensor is preferably configured to be able to obtain accurate reflectivity data of dark and bright portions of the test surface.

According to a feature, the method further includes measuring the amount of light reflected by the test surface in the field of view of the pre-scan sensor using a pre-scan sensor with a large depth of field. A pre-scan with a large depth of field may obtain an image of the test surface that is relatively sharp both on higher and lower parts of the test surface. Using a pre-scan sensor with a large depth of field would relax the need for the test surface to be strictly in focus for judging surface characteristics such as reflectivity. This allows for faster pre-scan measurements. For example, if the test surface has large height differences than the pre-scan measurement may be performed in one measurement if both the higher and lower surface areas are sufficiently in focus of the pre-scan sensor.

According to a feature, the pre-scan sensor is adapted to measure a height of the test surface, wherein preferably the height measurement sensor has a higher height resolution than the height resolution of the pre-scan sensor. This allows for the measurement of a coarse height map of the test surface during the pre-scan. Having information on height differences of the test surface before measurement with the, preferably higher resolution, height measurement sensor may have several advantages. For example, it allows for more accurate stitching of different measured areas, it allows for more accurate height measurements with the height measurement sensor, and it allows for faster height measurement with the height measurement sensor.

According to a feature, the pre-scan sensor takes measurements using a non-imaging method such as reflectometry or scatterometry. For example, the pre-scan sensor measures the amount of light reflected, or other illumination relevant property such as the surface roughness or surface height, using a non-imaging method such as reflectometry or scatterometry. These types of pre-scan sensors work pointwise on the test surface and consequently, in order to cover an area of the test surface, the test surface would have to be scanned laterally.

According to a feature, the height measurement sensor measures the height map using white light interferometry, non-scanning structured illumination microscopy, focus variation methods, or lateral scanning techniques.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE DISCLOSURE

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
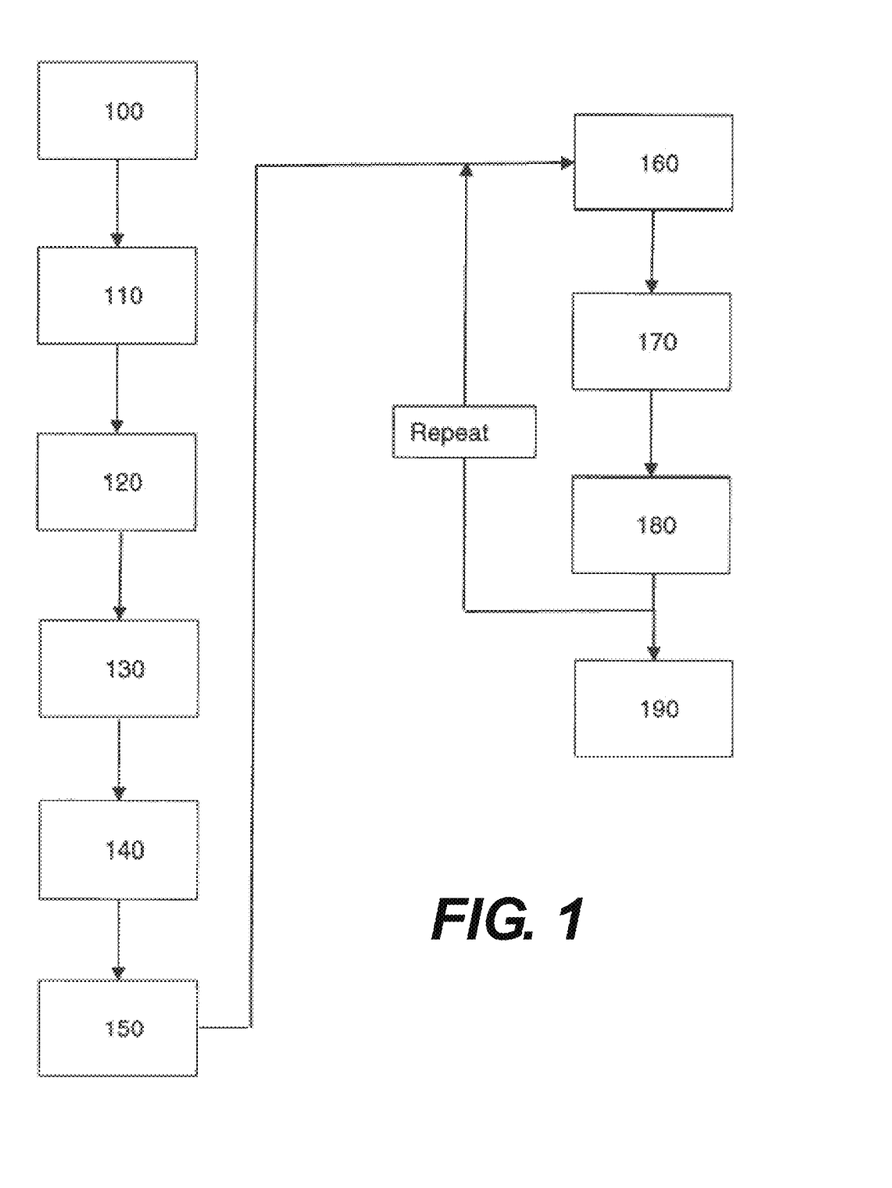
FIG. 1 shows a flow chart of the method according to the disclosure.

Referring to the drawings wherein like characters represent like elements, FIG. 1 shows a flow chart of the method according to the disclosure, wherein the pre-scan sensor 3 has a larger field of view 10 than the height measurement sensor 4 and the illumination intensity map has been subdivided into sub-fields.

The boxes of the flow chart depict steps according to the method of the disclosure. In a first step 100 according to the disclosure the test surface 2 is placed in a measuring location of the multi-sensor apparatus 5. The test surface 2 preferably has large reflectivity variations such as the example of a test surface 2 depicted in FIG. 2. The measuring location of the multi-sensor apparatus 5 is for example located such that the test surface 2 may be in focus of both the pre-scan sensor 3 and the height measurement sensor 4. The measurement location may further comprise means for supporting the test surface 2 in the location, which means may movably support the test surface 2.

In second step 110 the test surface 2 is illuminated using one or more of the light sources 6. The illumination of the test surface 2 is performed to allow the pre-scan sensor 3 to measure the amount of light reflected from the test surface 2 in a field of view 10 of the pre-scan sensor 3 in the next step 120 according to the method. Illumination of the test surface 2 may be performed coaxial with the pre-scan measurement or illumination may be performed along another axis depending on the measurement method used by the pre-scan sensor. In features according to the disclosure pre-scan measurement may be improved by configuring a property of the illumination, for example the wavelength of the light emitted by the light sources 6 may improve measurement quality depending on the test surface 2 and sensor type used.

The pre-scan measurement 120 for measuring the amount of light reflected from the test surface 2 makes use of a pre-scan sensor 3. The pre-scan sensor 3 does not necessarily need to be a sensor capable of measuring a height of the test surface 2. The pre-scan sensor 3 is preferably optimised for measuring light intensity reflected from the test surface 2. The pre-scan sensor 3 may be a focused 2D image of the test surface 2 using a camera. In another feature, the pre-scan sensor 3 may determine reflectivity making use of reflectometry or scatterometry.

After the pre-scan measurement 120 is performed the reflectivity of the test surface 2 in the field of view 10 of the pre-scan sensor 3 is determined 130. Depending on various factors, such as presence of steps and sharp edges, or variations material type, the reflectivity of the test surface 2 may vary substantially across the field of view 10 of the pre-scan sensor 3. Reflectivity of the test surface 3 may be determined based on the amount of light received by the pre-scan sensor 3 and the amount of light emitted by the one or more light sources 6. Regions that appear darker 12 in the pre-scan measurement have a lower reflectivity than regions that appear brighter 13 in the pre-scan measurement. In case the field of view 10 of the pre-scan sensor 3 is not sufficient to fully measure the test surface 2, multiple pre-scans may be performed in order to determine the reflectivity of the test surface 2.

Based on the determination of the reflectivity in the field of view 10 of the pre-scan sensor 3 an illumination intensity map is determined 140. The illumination intensity map includes information on the preferred illumination settings for the height measurement. This information may comprise settings for the spatial light modulator 7, the one or more light sources 6, locations of defects, steps, or glints, and other relevant information. The illumination map further includes information on a preferred modulation pattern 9 to be projected onto the test surface 2 to allow for improved height measurement of the test surface 2 using the height measurement sensor 4.

The illumination intensity map may have a resolution equal to the resolution of the height measurement sensor 4 and/or the resolution of the pre-scan sensor 3.

The illumination intensity map is subdivided 150 into sub-fields each corresponding to a field of view 11 of the height measurement sensor 4. Preferably the illumination intensity map is subdivided into sub-fields such that the sub-fields fully cover the illumination intensity map. In subsequent steps the height measurement sensor 4 performs a height measurement in each sub-field.

Throughput of the multi-sensor apparatus 5 may be improved when a pre-scan is combined with multiple height measurements. The pre-scan sensor 3 may measure a large portion of the test surface 2, whereas the height measurement has to be performed multiple times to measure the height map 1 of the test surface 2. In practice this situation may arise when the pre-scan sensor 3 has a larger field of view 10 than the height measurement sensor 4. In order to maximise throughput of the multi-sensor apparatus 5 the number of sub-fields is preferably kept to a minimum while covering the illumination intensity map.

Before performing 180 the height measurement in a sub-field the sub-field is illuminated 160 by one or more of the light sources 6. The spatial light modulator 7 is used 170 to modulate the light emitted by the one or more of the light sources 6 to create a modulation pattern 9 of light on the illuminated sub-field of the test surface 2 based on the illumination intensity map.

The modulation pattern 9 is used for improving the measurement of the height map 1 by the height measurement sensor 4 to provide the height measurement sensor 4 with an optimal light intensity. The spatial light modulator 7 may modulate the light such that light intensity for each pixel of the height measurement sensor 4 may be optimal.

The height map 1 of the illuminated sub-field is measured 180 by means of the height measurement sensor 4. The illuminated sub-field is illuminated by the one or more light sources 7 which light is modulated by the spatial light modulator 7 into a modulation pattern 9 that allows for improved measurement of the height map 1.

The steps 160, 170, and 180 are repeated for each sub-field of the illumination intensity map. In this way a height map 1 of for each sub-field is measured. In order to obtain a height map 1 of the test surface 2 the height maps 1 corresponding to the sub-fields are stitched 190 to form the height map 1 of the test surface 2. The stitching may be performed by a known method.

Figure 2:
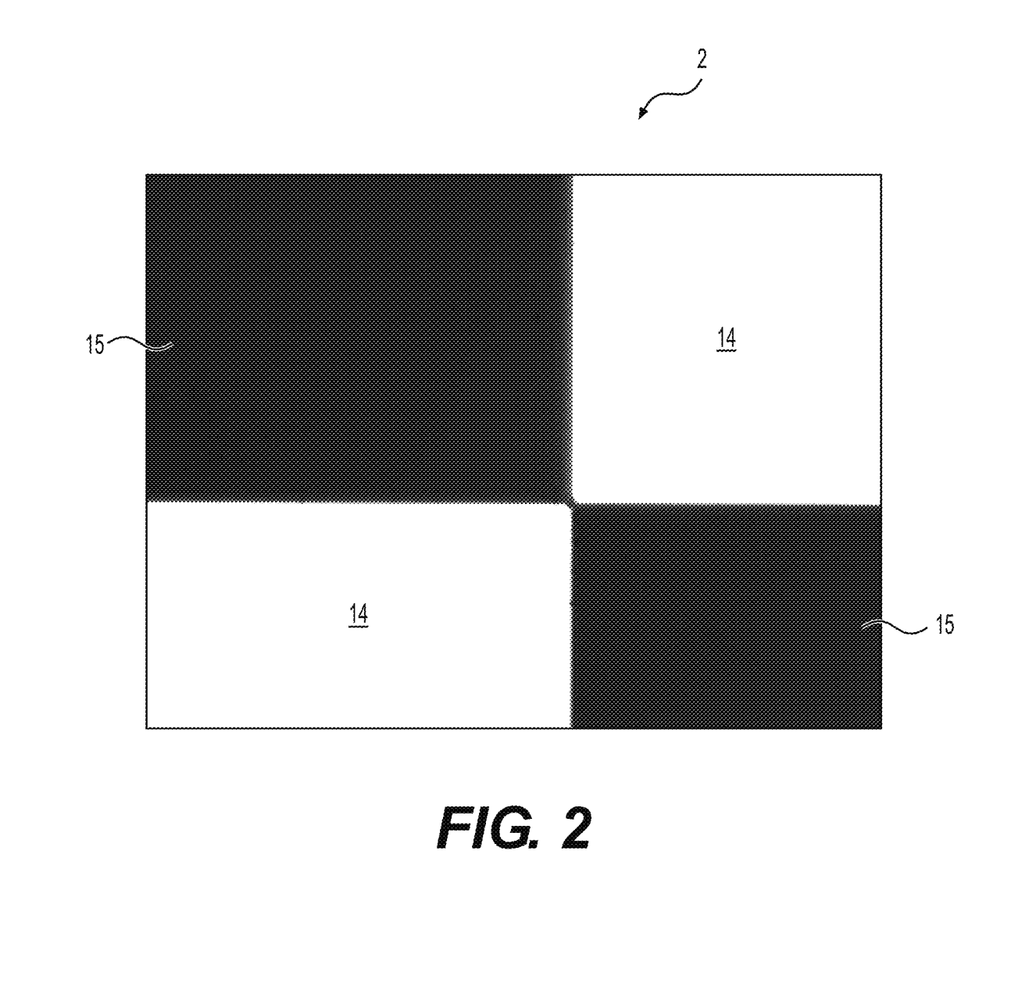
FIG. 2 shows a high contrast example of a test surface.

FIG. 2 shows a high contrast example of a test surface 2. The test surface 2 of FIG. 2 is a chrome-on-glass sample, wherein two squares on the test surface 2 are formed from chrome 14 and two squares on the test surface 2 are formed from glass 15. Chrome has a reflectivity index of about 90%, whereas glass has a reflectivity index of 4%.

Configuring the light sources 6 to provide an illumination intensity to allow for improved height measurement of the chrome 14 does not allow for a height measurement of the glass 15 since not enough light will be reflected by the glass 15 to provide a signal in the height measurement sensor 4. The result is an image such as shown in FIG. 2 wherein the glass 15 appears as dark squares.

If the light sources 6 are configured to provide an illumination intensity to allow for an improved height measurement of the glass 15, the chrome 14 will reflect too much light and the height measurement sensor 4 will give no signal due to oversaturation. This possibility is not shown in FIG. 2.

Figure 3:
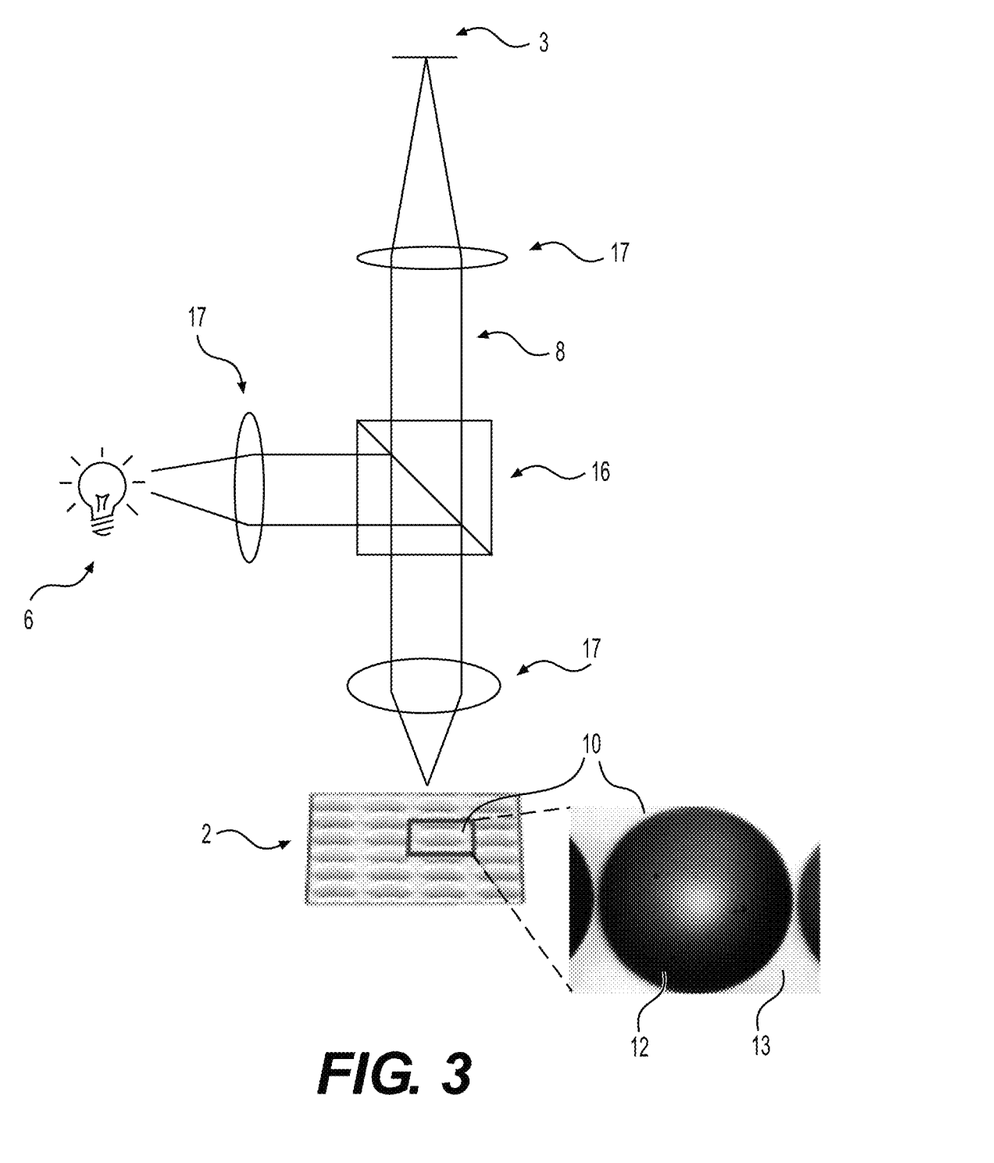
FIG. 3 shows a pre-scan sensor of a multi-sensor apparatus measuring the amount of light reflected from a test surface.

FIG. 3 shows a pre-scan sensor 3 of a multi-sensor apparatus 5 configured to measure the amount of light reflected from a test surface 2. The test surface 2 has a regular profile. In a field of view 10 of the pre-scan sensor 3 it is shown that the test surface 2 includes darker regions 12 and brighter regions 13. The darker regions 12 are spheres placed regularly on the test surface 2. Due to the curvature of the sphere light is reflected away from the measurement sensor 2 close to the equator of the sphere. These areas appear darker. The pole of the sphere and the background do reflect light back into the pre-scan sensor 3. These areas appear brighter.

The apparatus includes a light source 6 for illuminating the test surface 2 in the measurement position. The apparatus further includes a plurality of lenses 17 for guiding the light emitted by the light source 6 and reflected by the test surface. A beam splitter 16 is placed to allow the light from the light source 6 to be coaxial with the reflected light that is captured by the pre-scan sensor 3.

The pre-scan sensor 3 is configured to measure a light intensity range that includes the darker 12 and brighter 13 regions. As can be seen in the figure there is sharp contrast between the brightest and darkest regions. Detailed knowledge of reflectivity in these regions may be obtained through measurement with the pre-scan sensor 3.

As can be seen in the figure the field of view 10 of the pre-scan sensor 3 is smaller than the surface of the test surface 2. Hence, preferably, the pre-scan sensor 3 performs multiple measurements to gather information on the reflectivity of the test surface 3. The multiple fields of view 10 that are obtained in these multiple measurements may be stitched together to create a reflectivity map of the entire test surface 2.

Figure 4:
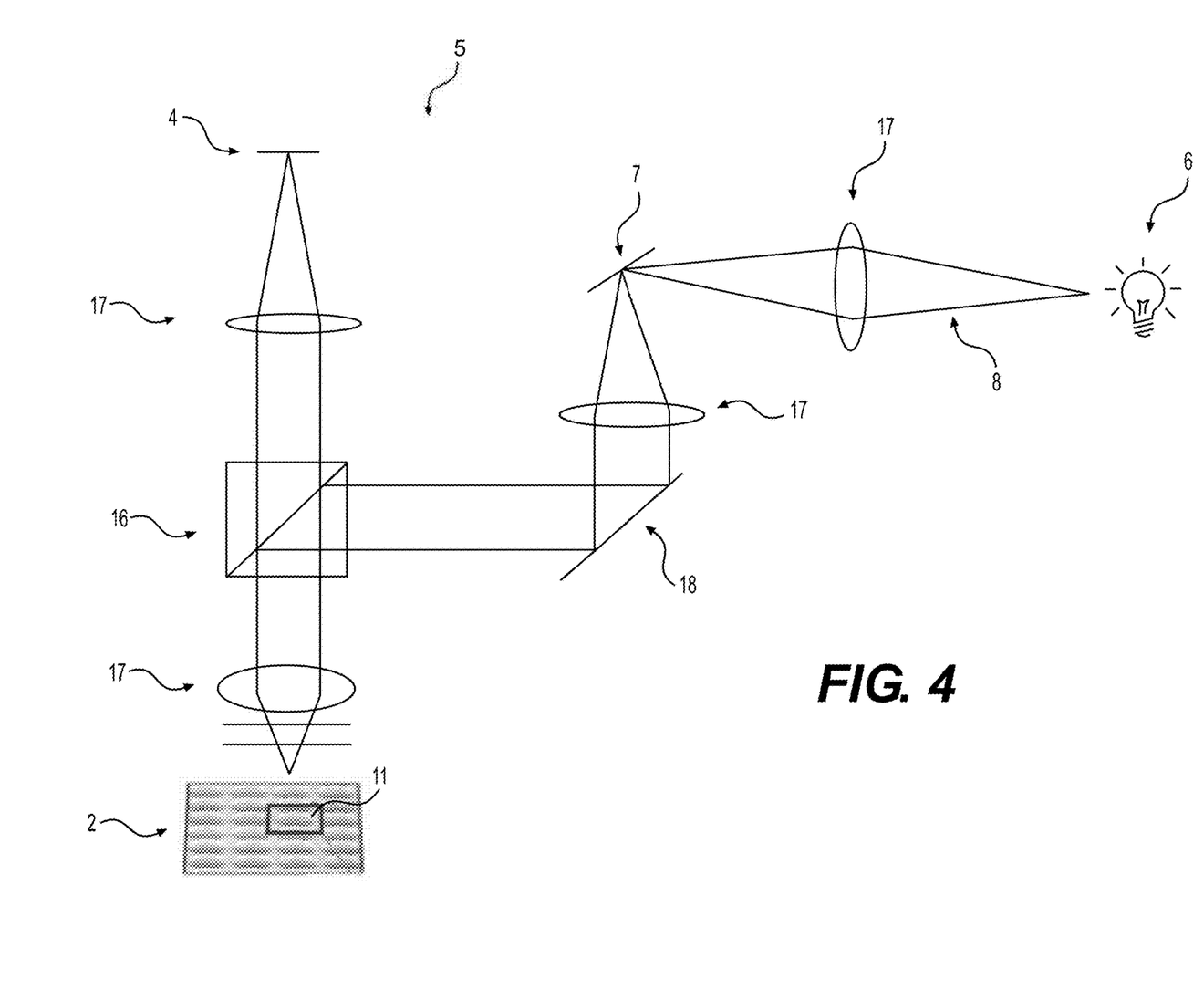
FIG. 4 shows a height measurement sensor of a multi-sensor apparatus measuring a height map of a test surface based on the pre-scan measurement of FIG. 3.

FIG. 4 shows a height measurement sensor 4 of a multi-sensor apparatus 5 measuring a height map 1 of a test surface 2 based on the pre-scan measurement of FIG. 3. The apparatus includes a light source 6 for illuminating the test surface 2. The light emitted by the light source 6 travels to the test surface 2 through a number of lenses 17, interacts with a spatial light modulator 7 and is redirected by a mirror 18 and a beam splitter 16.

In FIG. 4 the field of view 11 of the height measurement sensor 4 is about equal in size as the field of view 10 of the pre-scan sensor 3 of FIG. 3.

Light reflected from the test surface 2 travels coaxially towards the height measurement sensor 4.

The spatial light modulator 7 used by the multi-sensor apparatus 5 may be a digital micro-mirror device type, ferroelectric liquid crystal on silicon type, or any other suitable type of spatial light modulator 7. As can be seen in the figure the spatial light modulator 7 is placed in a light path 8 between the one or more light sources 6 and a measuring location of the multi-sensor apparatus 5.

Light emitted by the light source 6 is modulated by the spatial light modulator 9 before the light is reflected by the test surface 2 placed in the measuring location of the multi-sensor apparatus 5. This creates a modulation pattern 9 on the test surface which can be seen in FIG. 5b. The modulation pattern 9 allows for brighter regions to receive a lower light intensity and darker regions to receive a higher light intensity. It is possible that the modulation pattern includes nine various degrees of light intensity, for example several regions with different higher light intensity and several regions with different lower light intensity.

The spatial light modulator 7 is used to modulate light based on the illumination intensity map. The modulation pattern 9 is used for improving the measurement of the height map 1 by the height measurement sensor 4 to provide the height measurement sensor 4 with an optimal light intensity. The spatial light modulator 7 may modulate the light such that light intensity for each pixel of the height measurement sensor may be optimal.

Figure 5A:
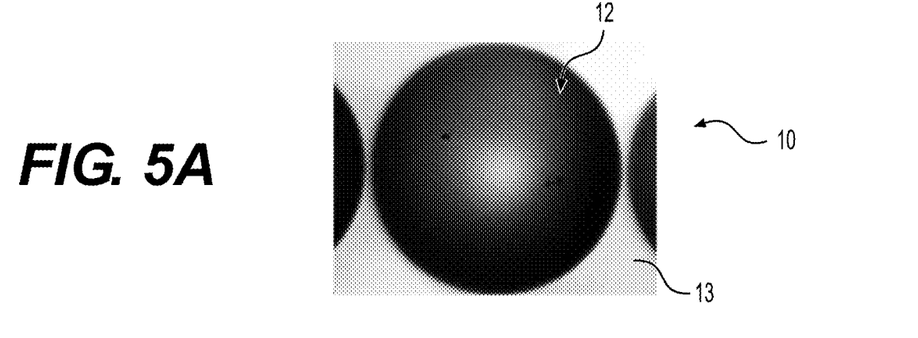
FIG. 5a shows the field of view of the pre-scan sensor of FIG. 3.
Figure 5B:
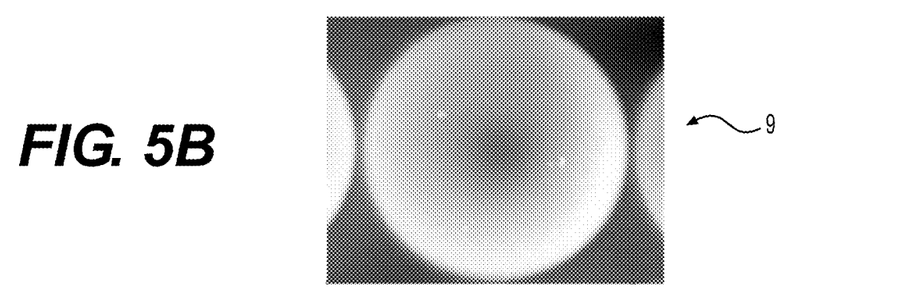
FIG. 5b shows a modulation pattern for the field of view of the test surface based on the measurement by the pre-scan sensor in FIG. 3.
Figure 5C:
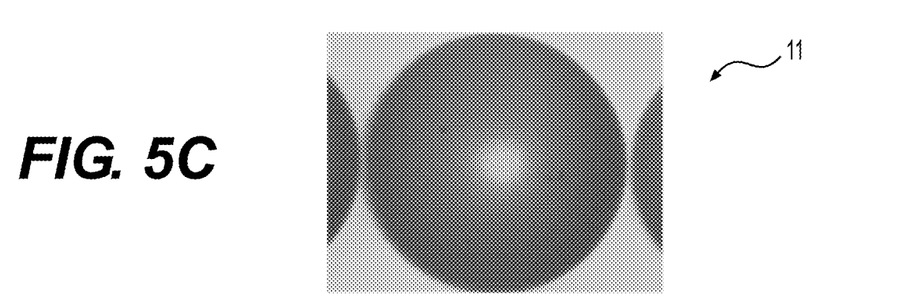
FIG. 5c shows the effect of modulation pattern on the test surface.
Figure 5D:
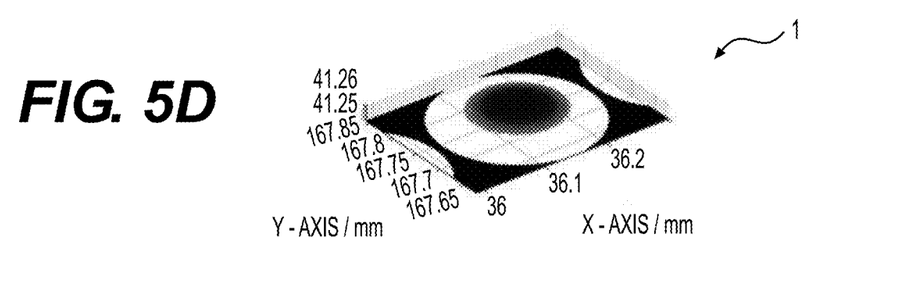
FIG. 5d shows a height map of a test surface measured in FIG. 4 using the modulation pattern of FIG. 5d.

FIG. 5a shows the field of view 10 of the pre-scan sensor 3 of FIG. 3, FIG. 5b shows a modulation pattern 9 for the field of view of the test surface 2 based on the measurement by the pre-scan sensor 3 in FIG. 3, FIG. 5c shows the effect of modulation pattern 9 on the test surface, and FIG. 5d shows a height map 1 of a test surface measured in FIG. 4 using the modulation pattern 9 of FIG. 5b.

FIGS. 5a, 5b, 5c and 5d all correspond or show the same area of the test surface 2. FIG. 5a shows the field of view 10 of the pre-scan sensor 3. FIG. 5b shows the corresponding modulation pattern 9 based on the illumination map according to the disclosure. FIG. 5c shows the field of view 11 of the height measurement sensor 4 when the test surface 2 is illuminated using the modulation pattern 9 shown in FIG. 5b. FIG. 5d shows the height map 1 obtained using the method of the disclosure.

As can be seen in FIG. 5b the modulation pattern 9 ensures that relative a lower light intensity reaches the brighter areas of FIG. 5a. The result of this can be seen in FIG. 5c, wherein the light intensity over the sphere is more uniform compared to FIG. 5a. Using this modulation pattern 9 the height measurement sensor 4 may accurately measure the height of the test surface 2 without hindrance due to oversaturation or too little light.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for measuring a height map of a test surface having a varying reflectivity using a multi-sensor apparatus having a pre-scan sensor and a height measuring sensor, and further having a plurality of light sources configured to illuminate the test surface and a spatial light modulator, wherein the spatial light modulator is positioned in a light path between at least one of the plurality of light sources, a measuring location of the multi-sensor apparatus, and the height measuring sensor, and wherein the spatial light modulator is configured to modulate light emitted from the at least one of the plurality of light sources, the method comprising:
    placing the test surface in the measuring location of the multi-sensor apparatus;
    illuminating the test surface using at least one of the plurality of light sources;
    measuring, via the pre-scan sensor, an amount of light reflected from the test surface in a field of view of the pre-scan sensor;
    determining, based on the measurement by the pre-scan sensor of the amount of light reflected, the reflectivity of the test surface in the field of view of the pre-scan sensor;
    determining an illumination intensity map based on the determination of the reflectivity in the field of view of the pre-scan sensor;
    illuminating the test surface using another one of the plurality of light sources different from the at least one of the plurality of light sources used for the pre-scan sensor measurement;
    dynamically modulating, via the spatial light modulator, light emitted by the another one of the plurality of light sources by strobing illumination of the another one of the plurality of light sources, and creating a modulation pattern of light on the test surface based on the illumination intensity map; and
    measuring, via the height measuring sensor, the height map of the test surface.

2. The method for measuring a height map according to claim 1, wherein the pre-scan sensor has a larger field of view than that of the height measurement sensor, the method further comprising:
    subdividing the illumination intensity map into sub-fields each corresponding to a field of view of the height measurement sensor;
    illuminating a sub-field of the test surface using the another one of the plurality of light sources;
    modulating, using the spatial light modulator, light emitted by the another one of the plurality of light sources, and creating a modulation pattern of light on the illuminated sub-field of the test surface based on the illumination intensity map;
    measuring, via the height measuring sensor, a height map of the illuminated sub-field;
    repeating the illuminating the sub-field and the measuring of the height map of the illuminated sub-field, for each sub-field of the test surface, and obtaining a height map for each sub-field of the test surface; and
    stitching the height maps of the sub-fields to form the height map of the test surface.

3. The method for measuring a height map according to claim 1, wherein at least one of:
    the illumination intensity map is further based on performance data of the pre-scan sensor with regard to a received light intensity; and
    the modulation pattern on the test surface is additionally based on performance data of the height measurement sensor with respect to a received light intensity.

4. The method for measuring a height map according to claim 1, wherein a size of the modulation pattern on the test surface corresponds to a measurement resolution of the height measurement sensor.

5. The method for measuring a height map according to claim 1, further comprising configuring at least one of wavelength, wavelength distribution, pulse frequency, or pulse duration of the light emitted by the plurality of light sources during illumination of the test surface.

6. The method for measuring a height map claim 1, wherein the measuring, via the pre-scan sensor, further comprises measuring a light intensity range that includes darkest and brightest portions of the test surface.

7. The method for measuring a height map according to claim 1, wherein the pre-scan sensor has a large depth of field.

8. The method for measuring a height map according to claim 1, wherein:
    the measuring, via the pre-scan sensor, further comprises measuring a height of the test surface; and
    the height measurement sensor has a higher height resolution than the height resolution of the pre-scan sensor.

9. The method for measuring a height map according to claim 1, wherein the measuring, via the pre-scan sensor, is performed using one of reflectometry or scatterometry.

10. The method for measuring a height map according to claim 1, wherein the measuring, via the height measuring sensor, further comprises measuring the height map using white light interferometry, non-scanning structured illumination microscopy, focus variation methods, or lateral scanning methods.

11. The method for measuring a height map according to claim 1, wherein the dynamically modulating occurs while the height measurement sensor measuring progresses across the test surface.

12. The method for measuring a height map according to claim 1, wherein the strobing illumination uses regular flashes of light emitted by the another one of the plurality of light sources.

13. The method for measuring a height map according to claim 1, wherein the strobing illumination uses regular flashes of light emitted by the another one of the plurality of light sources and an additional light source of the plurality of light sources.

14. The method for measuring a height map according to claim 1, further comprising using at least one of location of sharp edges, colour of the test surface, or material type of the test surface, to determine the illumination intensity map.

15. The method for measuring a height map according to claim 14, wherein the measuring, via the pre-scan sensor, further comprises measuring at least one of location of sharp edges, colour of the test surface, or material type of the test surface, for determining the illumination intensity map.

16. A method for measuring a height map of a test surface having a varying reflectivity using a multi-sensor apparatus having a pre-scan sensor and a height measuring sensor, and further having a plurality of light sources configured to illuminate the test surface and a spatial light modulator, wherein the spatial light modulator is positioned in a light path between at least one of the plurality of light sources, a measuring location of the multi-sensor apparatus, and the height measuring sensor, wherein the spatial light modulator is configured to modulate light emitted from the at least one of the plurality of light sources, and wherein the pre-scan sensor has a larger field of view than that of the height measurement sensor, the method comprising:
- placing the test surface in the measuring location of the multi-sensor apparatus;
- illuminating the test surface using at least one of the plurality of light sources;
- measuring, via the pre-scan sensor, an amount of light reflected from the test surface in a field of view of the pre-scan sensor;
- determining, based on the measurement by the pre-scan sensor of the amount of light reflected, the reflectivity of the test surface in the field of view of the pre-scan sensor;
- determining an illumination intensity map based on the determination of the reflectivity in the field of view of the pre-scan sensor;
- subdividing the illumination intensity map into sub-fields each corresponding to a field of view of the height measurement sensor;
- illuminating a sub-field of the test surface using an another one of the plurality of light sources different from the at least one of the plurality of light sources used for the pre-scan sensor measurement;
- modulating, using the spatial light modulator, light emitted by the another one of the plurality of light sources, and creating a modulation pattern of light on the illuminated sub-field of the test surface based on the illumination intensity map;
- measuring, via the height measuring sensor, a height map of the illuminated sub-field;
- repeating the illuminating the sub-field and the measuring of the height map of the illuminated sub-field, for each sub-field of the test surface, and obtaining a height map for each sub-field of the test surface; and
- stitching the height maps of the sub-fields to form the height map of the test surface.

* * * * *